United States Patent
Lévesque et al.

(10) Patent No.: US 7,324,724 B2
(45) Date of Patent: Jan. 29, 2008

(54) OPTICAL FIBER DEVICES USING COMPONENT INSERTION

(75) Inventors: Marc Lévesque, Sainte-Augustin-de-Desmaures (CA); Daniel Cantin, Sainte-Foy (CA); René Beaulieu, Ancienne-Lorette (CA)

(73) Assignee: Institut National D'Optique, Sainte-Foy (Quebec) (CA)

( * ) Notice: Subject to any disclaimer, the term of this patent is extended or adjusted under 35 U.S.C. 154(b) by 18 days.

(21) Appl. No.: 11/254,802

(22) Filed: Oct. 21, 2005

(65) Prior Publication Data

US 2007/0104430 A1  May 10, 2007

(51) Int. Cl.
G02B 6/26 (2006.01)
G02B 6/42 (2006.01)

(52) U.S. Cl. .......................... 385/31; 385/49; 385/73; 385/88

(58) Field of Classification Search ................ 385/123, 385/125, 12, 31, 37, 50–52, 9; 219/121.6
See application file for complete search history.

(56) References Cited

U.S. PATENT DOCUMENTS

| | | | |
|---|---|---|---|
| 4,667,830 A | 5/1987 | Nozaki, Jr. et al. | |
| 4,889,407 A * | 12/1989 | Markle et al. | 385/12 |
| 4,958,897 A * | 9/1990 | Yanagawa et al. | 385/50 |
| 5,268,978 A | 12/1993 | Po et al. | |
| 5,464,581 A | 11/1995 | Van den Engh | |
| 5,483,469 A | 1/1996 | Van den Engh et al. | |
| 5,602,039 A | 2/1997 | Van den Engh | |
| 5,643,796 A | 7/1997 | Van den Engh et al. | |
| 5,659,644 A | 8/1997 | DiGiovanni et al. | |
| 5,700,692 A | 12/1997 | Sweet | |
| 5,818,981 A | 10/1998 | Pan et al. | |
| 5,983,676 A | 11/1999 | Brown | |

(Continued)

FOREIGN PATENT DOCUMENTS

JP          02100003 A  *  4/1990

(Continued)

OTHER PUBLICATIONS

Laser drilling and routing in optical fibers and tapered micropipettes using excimer, femtosecond, and $CO_2$ lasers, as found on Internet website http://adsabs.harvard.edu/cgi-bin/nph-bib_query?bibcode=2004SPIE.5578..596C& Oct. 2004.

*Primary Examiner*—Hemang Sanghavi
(74) *Attorney, Agent, or Firm*—Ogilvy Renault LLP

(57) ABSTRACT

The present invention provides an optical fiber device that takes advantage of the fiber structure to construct mechanically stable devices with components inserted in the optical path. An optical component is inserted in a cavity transversally machined across an optical fiber. The component is secured in the cavity and functionally interrelates with light propagated in the optical fiber. The invention also provides a method for manufacturing an optical fiber device with a component insertion into an optical fiber by machining a cavity in an optical fiber, providing a solid component to be inserted in the optical fiber, positioning the component inside the cavity, and securing the component in the cavity. The component is preferably provided as a glass ribbon and the component is preferably secured in the cavity using laser fusion.

22 Claims, 7 Drawing Sheets

U.S. PATENT DOCUMENTS

| | | |
|---|---|---|
| 6,137,812 A * | 10/2000 | Hsu et al. ............... 372/6 |
| 6,246,026 B1 | 6/2001 | Vergeest |
| 6,438,294 B1 | 8/2002 | Lauzon et al. |
| 6,509,547 B1 | 1/2003 | Bernstein et al. |
| 6,535,655 B1 | 3/2003 | Hasui et al. |
| 6,704,479 B2 * | 3/2004 | Koplow ............... 385/31 |
| 6,713,019 B2 | 3/2004 | Ozasa et al. |
| 6,793,642 B2 | 9/2004 | Connelly et al. |
| 2003/0098421 A1 | 5/2003 | Ho |
| 2003/0174922 A1 * | 9/2003 | Hasui et al. ............... 385/11 |
| 2006/0233495 A1 * | 10/2006 | Ide et al. ............... 385/73 |

FOREIGN PATENT DOCUMENTS

JP    02167507 A  *  6/1990

* cited by examiner

OPTICAL FIBER DEVICES USING COMPONENT INSERTION

BACKGROUND OF THE INVENTION

1) Field of the Invention

The invention relates to fiber optic devices. More particularly, the invention relates to a method of manufacturing fiber optic devices that uses functional components inserted in the optical path.

2) Description of the Prior Art

Several in-line optical fiber devices use the insertion of optical components between two optical fibers for performing various functions as spectral filtering, spatial filtering, beam splitting, sensing, isolating or polarizing. Most devices use lenses to collimate a light beam exiting an input optical fiber and to collect the light beam to an output optical fiber after propagation across the optical component or components. Precise alignment and high mechanical stability of the optical fiber cores and lenses are required to obtain a collimated beam.

The use of collimating lenses may not be necessary when using very thin optical component which reduces the optical path length between the two fibers. Alignment of the fiber cores requires high precision and high mechanical stability in order to optimize light collection at the output optical fiber and to minimize insertion loss and insertion loss variation. The high mechanical requirements are difficult to achieve in severe environmental conditions.

The prior art has not completely fulfilled requirements of insertion loss, alignment and mechanical stability for optical fiber devices using in-line insertion of optical components. There is thus a need for a method of manufacturing of optical fiber devices that overcomes at least some of the above-mentioned drawbacks.

SUMMARY OF THE INVENTION

It is an object of the present invention to provide an optical fiber device that overcomes at least some of the above-mentioned drawbacks.

It is also an object of the present invention to provide a method for manufacturing optical fiber devices that overcomes at least some of the above-mentioned drawbacks.

Therefore, in accordance with the present invention, there is provided an optical fiber device comprising: an optical fiber for guiding light to be propagated in the optical fiber, said optical fiber having a peripheral surface, a fiber core and a fiber clad; a cavity in said optical fiber, said cavity penetrating said optical fiber through said peripheral surface and said fiber clad in direction of said fiber core; and a solid component secured inside said cavity and associated with said core so as to create a functional effect on said light to be propagated in said optical fiber.

In accordance with the present invention, there is also provided a method for manufacturing an optical fiber device comprising: machining a cavity in an optical fiber; providing a solid component to be inserted in said optical fiber; positioning said component inside said cavity; and securing said component in said cavity.

The present invention provides an optical fiber device that takes advantage of the fiber structure to construct mechanically stable devices with components inserted in the optical path. An optical component is inserted in a cavity transversally machined across an optical fiber. The component is secured in the cavity and functionally interrelates with light propagated in the optical fiber. The invention also provides a method for manufacturing an optical fiber device with a component insertion into an optical fiber by machining a cavity in an optical fiber, providing a solid component to be inserted in the optical fiber, positioning the component inside the cavity, and securing the component in the cavity. The component is preferably provided as a glass ribbon and the component is preferably secured in the cavity using laser fusion.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

A method for manufacturing an optical fiber device with a component insertion in an optical fiber is described herein. A cavity is made in the optical fiber, for instance, by laser micromachining. The cavity enters the optical fiber by its peripheral surface and typically crosses the fiber core. In an embodiment, the cavity preferably goes throughout the optical fiber. A solid functional component is provided and positioned in the cavity and across the fiber core. The component is secured and sealed in the cavity using glass fusion. The inserted component is typically a solid component (e.g., optical component) that will have a functional effect on light propagated in the optical fiber. The component may be a spectral filter, a spatial filter, a coupler, a sensor using spectroscopy, a sensor using fluorescence, a sensor by polarization or any other functional solid component including crystals, filters, mirrors, indicators, piezoelectric components, polarizers, etc. The component insertion in an optical fiber also offers the possibility of creating numerous applications by combining various functional components in the same optical fiber.

Figure 1:
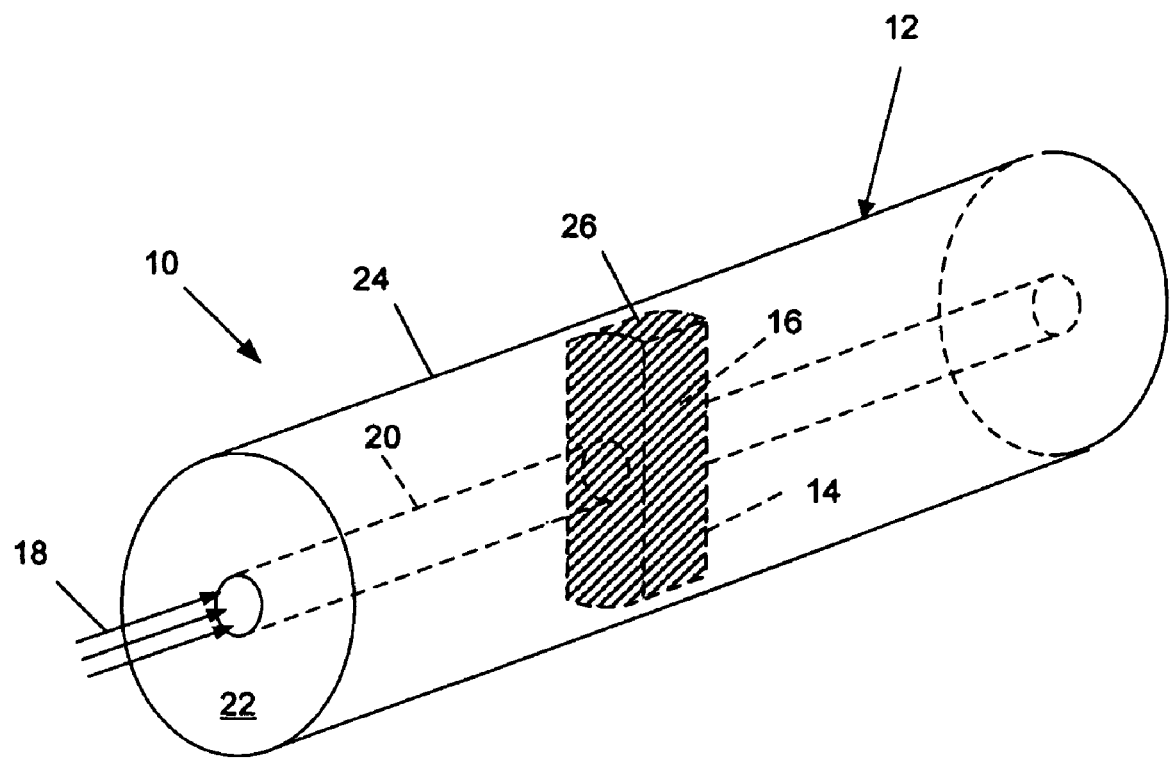
FIG. 1 is a perspective view of an optical fiber device according to an embodiment of the present invention.

Referring to the drawings, FIG. 1 illustrates an optical fiber device 10 created by an insertion of a solid functional component 16 in an optical fiber 12 through a cavity 14. In the embodiment of FIG. 1, the cavity 14 is transversally defined in the optical fiber 12 from the peripheral surface 24 of the fiber clad 22 and across the fiber core 20. The component is positioned in the cavity to intersect the fiber core 20 and is secured in place. Light 18 injected and guided in the optical fiber 12 propagates through the component and is coupled forwardly within the optical fiber 12. The component modifies light 18 to create a functional effect like those cited above.

In an embodiment, the cavity 14 is a transverse hole going throughout the optical fiber 12. The cavity 14 could also stop in the optical fiber 12 so that there would be only one opened end 26. Additionally, the cavity 14 is drilled transversally in the optical fiber and crosses the fiber core with a 90-degree angle. The cavity may also cross the core at a different angle depending on the function to be performed. The angle typically ranges from about 30 degrees to 150 degrees.

Figure 2:
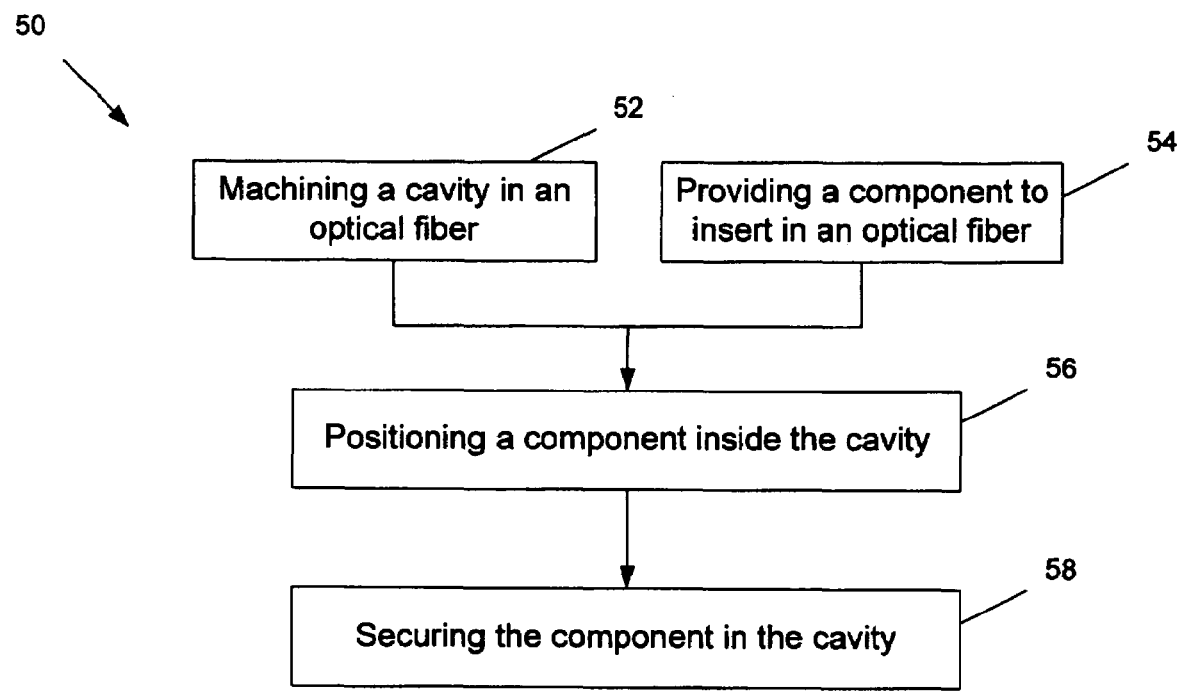
FIG. 2 is a flowchart illustrating a method of manufacturing an optical fiber device according to another embodiment of the present invention.

FIG. 2 illustrates a method for manufacturing an optical fiber device by an insertion of a component in an optical fiber. The method 50 comprises step 52 of machining a cavity (e.g., transversally) in an optical fiber. The cavity preferably intersects the fiber core. Thereafter, in step 54, a solid component to be inserted into the optical fiber is provided. In step 56, the component is positioned inside the cavity. In step 58, the component is secured to the cavity.

According to one embodiment, the cavity is drilled in a fused silica optical fiber using laser drilling. The optical fiber is typically a multi-mode optical fiber with a clad diameter of 125 µm. The laser is preferably a carbon dioxide ($CO_2$) laser, and the following parameters can be used to machine the cavity. A 200 W laser beam is focalized on the optical fiber. The modulation frequency is of 25 kHz with a duty cycle of 0.5. A cavity going throughout the fiber and with a diameter of 15 µm is obtained after about ten laser pulses. Multiple repetitions of these steps with a 10 µm translation perpendicular to the laser beam between each repetition allow obtaining cavities with different shapes. The cavity obtained by drilling fused silica optical fiber has smooth surfaces compared to ones obtained by drilling in other kinds of glass or with other lasers. Micro cracks have been known to appear on the surface when the melted material solidifies. As will be discussed later, a cavity with smooth surfaces will give rise to a less brittle optical device after fusion of a component in the cavity.

Alternatively, the laser used for micro-machining could also have been a femtosecond laser or an excimer laser. A femtosecond laser gives increased accuracy and resolution in the micro-machined patterns but the process can be longer than it is in the case of a $CO_2$ laser. It has been observed that optical fibers drilled using excimer lasers and femtosecond lasers are more brittle than the ones processed using $CO_2$ lasers, which is an advantage of the last one. $CO_2$ lasers are widely used in the industry for their reliability, compactness, relative low cost and low maintenance requirements.

The same process could be applied to any other kind of fused silica fibers instead of the multi-mode fiber. For specific applications of the optical device, one could find it advantageous to use a single-mode fiber, a multi-clad fiber, a larger fiber or a doped fiber.

In the above-described embodiment, laser drilling has been used for machining a cavity in an optical fiber. In the manufacturing of an optical device with insertion of a component, other machining techniques could replace the laser drilling.

Figure 3:
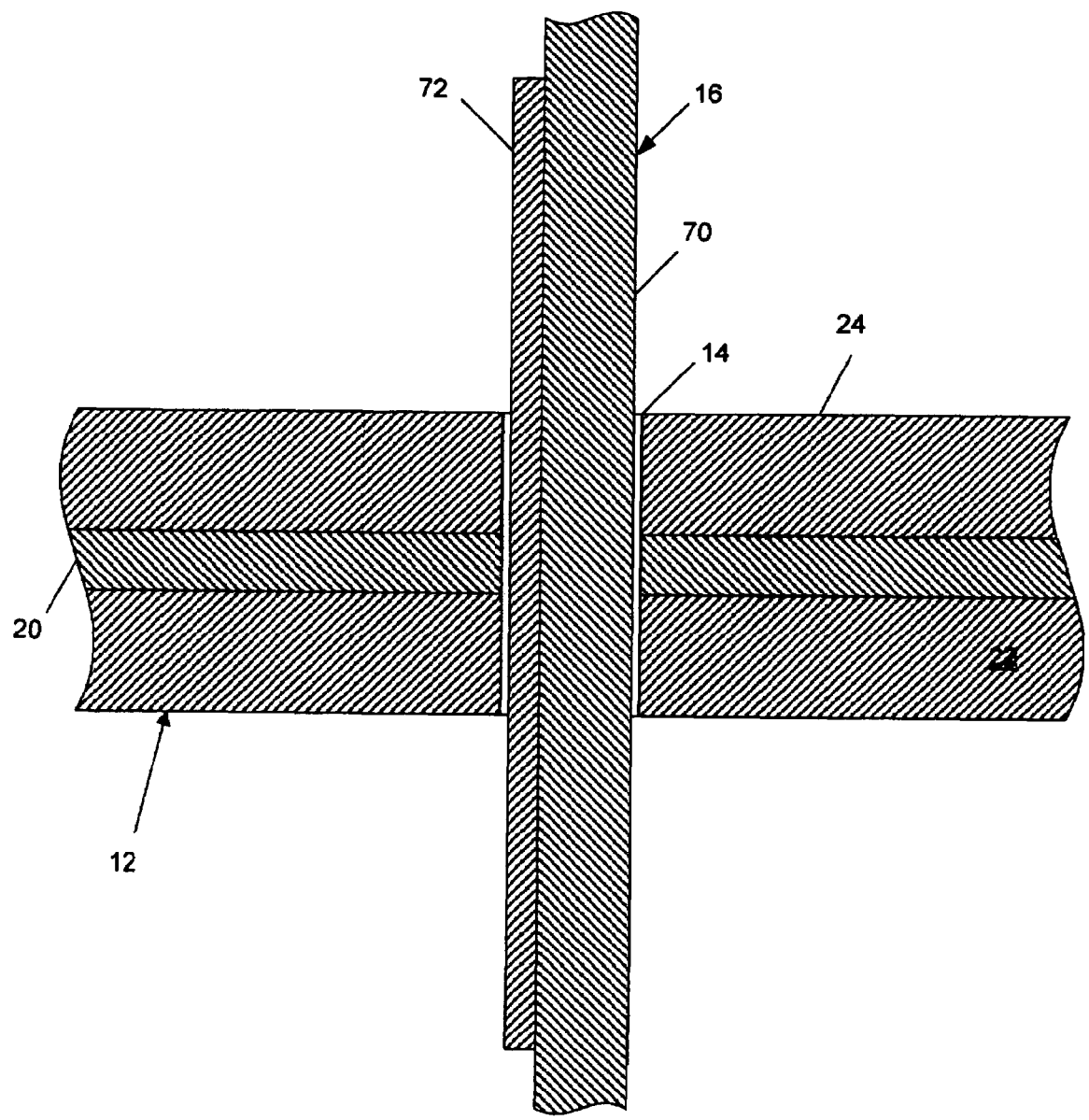
FIG. 3 is a cross-section view of an optical fiber with a cavity and a ribbon positioned in the cavity, according to an embodiment of the method of FIG. 2.

In an embodiment, the component to be inserted in the optical fiber is provided as a glass ribbon. The glass ribbon is typically manufactured using a method similar to optical fiber manufacturing method. For instance, ribbons with rectangular shapes and dimensions of about 20 to 300 µm are manufactured using optical fiber drawing technique. A functional element is fixed to the ribbon and the ribbon is inserted in the cavity like a thread in a needle eye. FIG. 3 illustrates a ribbon 70 positioned in the cavity 14. The ribbon 16 to be inserted in the optical fiber has a specific shape and dimensions in order to fit into and to preferably fill the cross section of the cavity 14. According to an embodiment, a fused silica ribbon 70 with dimensions of 33 µm by 100 µm is used. A functional element 72 is installed on the ribbon using, for instance, thin film deposition, gravity deposition or dip-coating. The solid functional element 72 could also be inserted in a cavity machined in the ribbon. Providing the solid functional element 72 on or in a ribbon provides a mechanical support to align the element 72 in the optical fiber 12.

Figure 4:
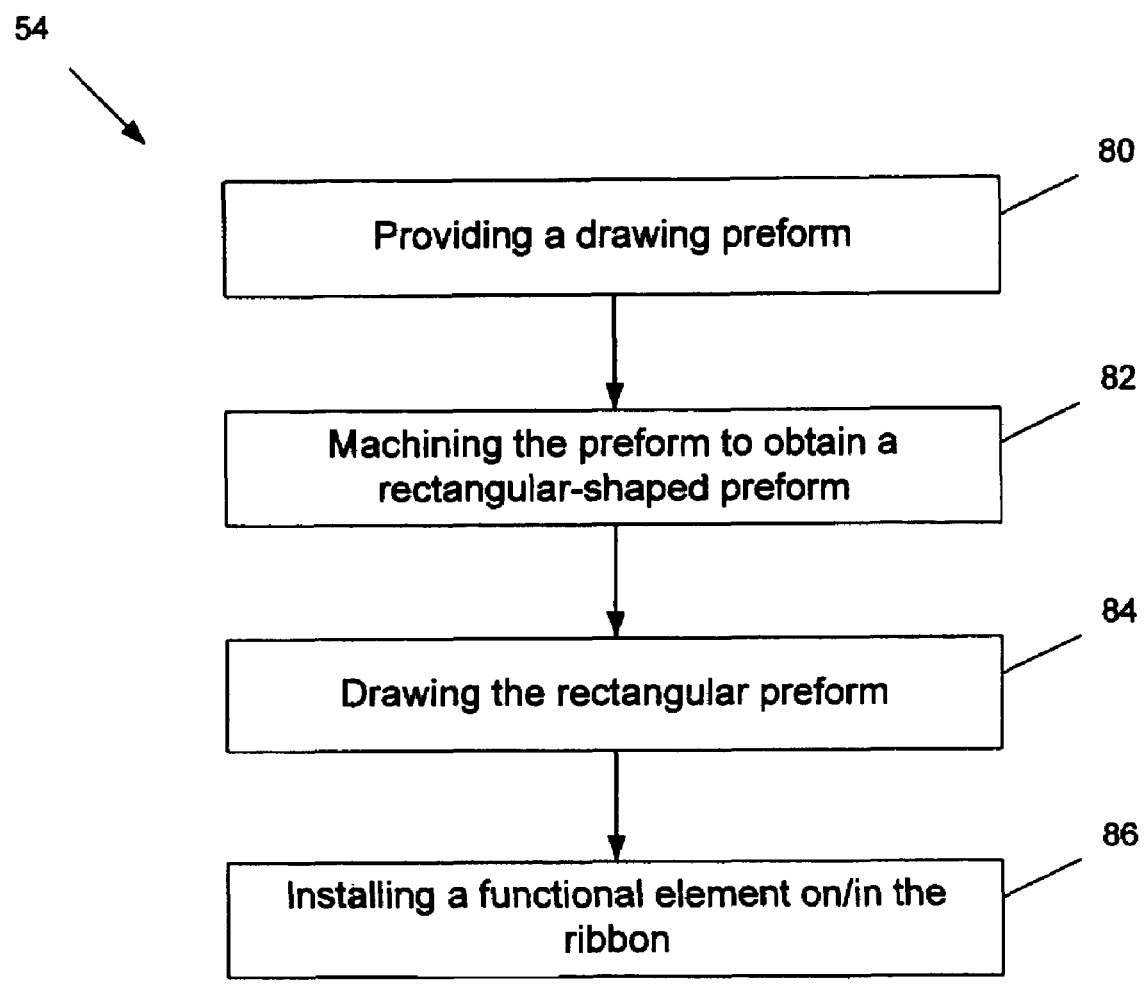
FIG. 4 is a flowchart illustrating steps involved in providing a component to be inserted in an optical fiber.

FIG. 4 illustrates the main steps involved in providing 54 the component to be inserted in the optical fiber when the component is provided as a ribbon. In the first step 80 a fused silica optical fiber drawing preform is provided. The preform has a diameter of several millimeters. The second step 82 is to machine the preform to obtain a rectangular shaped preform. In the third step 84, the rectangular preform is drawn as an optical fiber would be. Temperature and drawing speed parameters are previously adjusted. The last step 86, is to install a functional element on or in the ribbon.

The functional element to be installed on the ribbon may be a material with physical properties that varies with temperature or other environmental conditions, a dielectric material for obtaining semitransparent mirrors, a spatially distributed opaque material for partially blocking light propagated in the optical fiber or any other element that accomplishes a useful operation. In an embodiment, installation of the functional element on the ribbon is made by thin film deposition in vacuum. A thicker functional element could be obtained by gravity deposition or by dip-coating.

The above described method for providing the component as a ribbon is meant to be exemplary only. The component could be provided as single-piece component or multiple integrated elements machined or otherwise fabricated to fit in the cavity. It is only required that the component fits in the cross section of the cavity while the component may be fully enclosed in the cavity or may exceed the fiber diameter.

In an embodiment, the component to be positioned inside the cavity is a ribbon. The ribbon is positioned in the cavity by threading the ribbon in the cavity like in a needle eye. Insertion and, positioning of the component in the cavity is made using micromanipulators and cameras for visual feedback. The process may be automated using computer-controlled micromanipulators and imaging software feedback. Optical feedback may also be used for alignment by propagating an optical signal in the optical fiber to the component and reading the output signal that provides a feedback signal for optimizing the alignment of the component.

The component to be positioned in the cavity could be a single-piece component as opposed to a ribbon. A single-piece component could be positioned in the cavity using micromanipulators and visual feedback. The component may be dropped in the cavity if the cavity has one closed end, i.e. the cavity does not go throughout the fiber.

Figure 5:
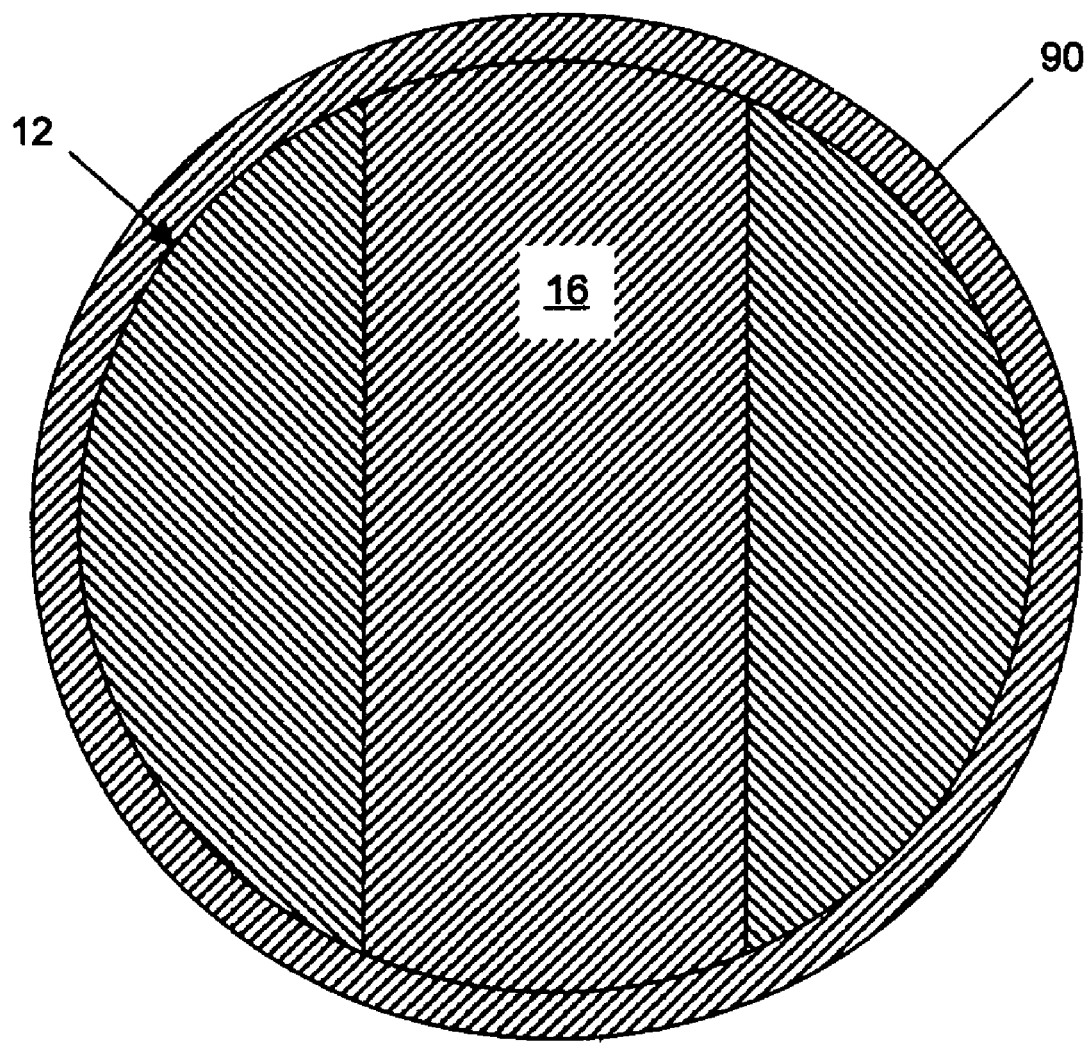
FIG. 5 is a cross-section view of the optical fiber device of FIG. 1, wherein the optical fiber is inserted in a capillary.

According to an embodiment, the component is secured in the optical fiber using laser glass fusion. FIG. 5 shows an optical fiber device after securing with glass fusion. The component 16 is secured and sealed in the optical fiber 12. The optical fiber 12 locally surrounding the component 16 and the component itself are melted using laser heating. The component 16 and the optical fiber 12 are therefore fused together to create an integrated hermetically sealed all-optical fiber device 10 with suitable mechanical stability and strength.

The component is secured in the optical fiber using $CO_2$ laser glass fusion and the following parameters can be used to fuse the component to the optical fiber. A laser beam is focalized on the optical fiber at the position of the ribbon. As an example, a 50 W laser beam operated at a frequency of 25 kHz and a duty factor of 0.1 can be used. The ribbon preferably fills the cross-section of the cavity and preferably exceeds the fiber diameter so that the fused material completely fills the cavity, leaving no empty spots in the optical device. The fused material rounds in shape because of surface tensions and the very sharp surfaces are rounded by the process. Ribbon exceeding the fiber diameter easily separates by melting it with the same laser.

For fused device to show suitable strength properties the fusion conditions need to be appropriately tuned and the cavity surfaces to be clean and smooth. Smooth surfaces are obtained by machining using $CO_2$ lasers. Surfaces may also be subsequently smoothed using $CO_2$ laser in cases were another laser is used for machining.

For specific applications, it may be desirable that the component be completely enclosed in fused silica. As an example, if the inserted component is not a glass component and does not fuse with the optical fiber, enclosing of the component may be desired to properly secure and seal the component in the optical fiber. As shown in FIG. 5, the optical fiber 12 including the component 16 may be inserted in a fused silica capillary 90, with the capillary 90 being fused to the optical fiber 12 using, for instance, laser fusion as described previously.

For specific applications using temperature sensitive components as, for instance, crystals, it may be useful to use glass powder with low melting temperature in the fusion process. The powder is selected as a function of its coefficient of thermal expansion, of its melting temperature, of its spectral transmission and of its miscibility. In this case, powders from Schott is used but SEM-COM powders could be used as well. The powder is inserted in the cavity and around the functional component. As an example, fusion is performed using a CO2 laser with a 200 µm diameter focused laser beam. The laser power is 100 W, the operation frequency is 25 kHz and the duty factor is 0.05.

Electrical arc fusion could be used as an alternative to laser fusion for securing the component in the optical fiber. Laser fusion is more localized and offers a well suited control of the fusion process.

The above description has been limited to single component insertion but it is contemplated that multiple components or multi-layer components can be inserted in a single cavity. As an example, multiple layers could be deposited on one ribbon that would be inserted in the optical fiber. Multiple components can be stacked and inserted simultaneously into a single cavity. Additionally, numerous configurations of devices can be created by combining various functional components in the same optical fiber.

Optical fiber devices with component insertion in an optical fiber offer the opportunity for various potential applications by taking advantage of the fiber structure to construct mechanically stable devices. Some of them will be described in the following paragraphs.

Figure 6A:
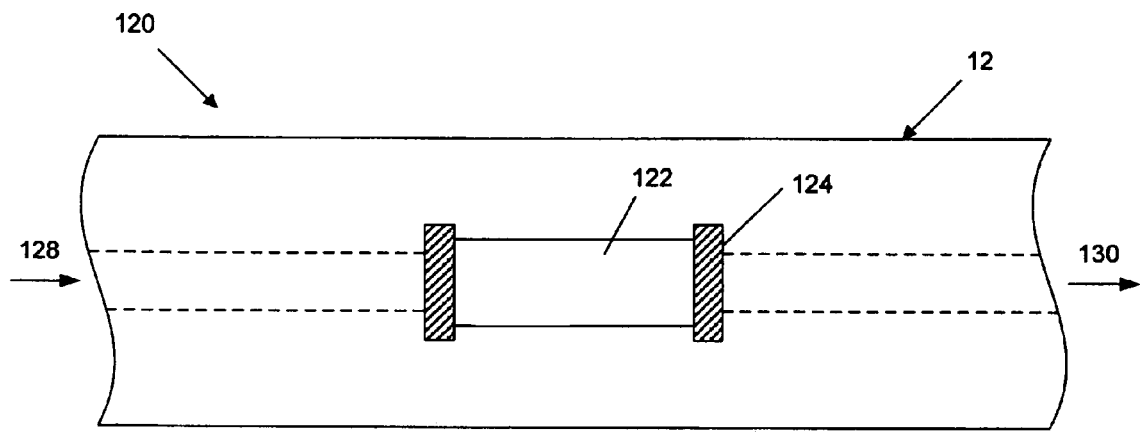
FIG. 6A is a top plan view of a fiber-integrated laser using the optical fiber device configuration of FIG. 1, wherein mirrors are adjoined to a cavity and pump is guided in the optical fiber.

FIG. 6A depicts a fiber-integrated laser 120. Dichroic mirrors 124 are integrated on each side of a laser-drilled cavity 122 and are adjoined to the cavity 122. Lasing medium is inserted in the cavity 122. In this case, the lasing medium is a crystal, but it could also be a liquid. A laser pump 128 is provided by the optical fiber 12 and a laser emission 130 is collected using the optical fiber 12.

Figure 6B:
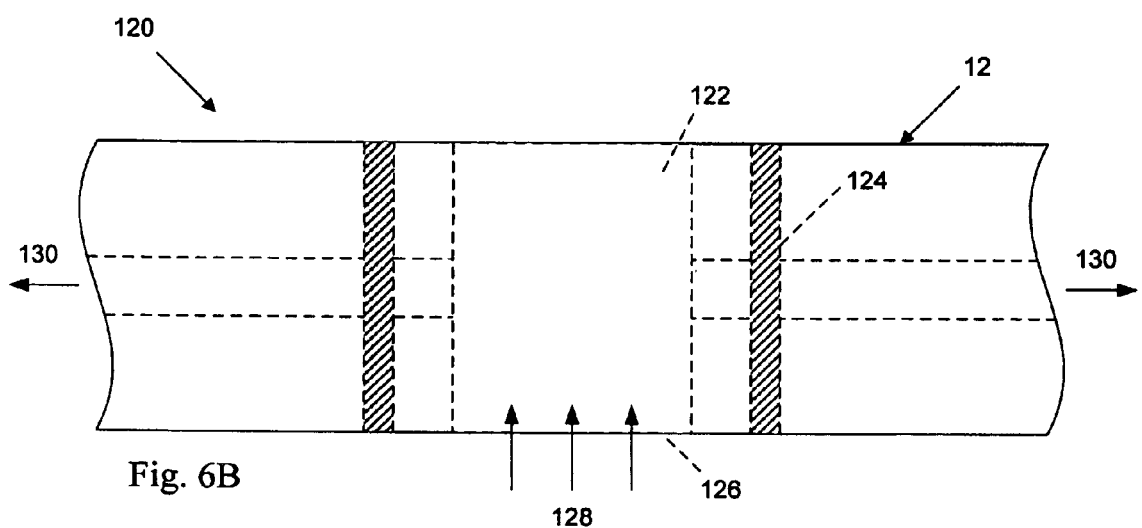
FIG. 6B is a front elevation view of a fiber-integrated laser using the optical fiber device configuration of FIG. 1, wherein mirrors are distant to a cavity and pump is provided from an opening of the cavity.

In the configuration of FIG. 6B, a mirror 124 is integrated on each side of a cavity 122 and is distant to the cavity 122. A laser pump 128 is provided by the opening 126 of the cavity and a laser emission is collected using the optical fiber 12.

Dye micro lasers can be manufactured using a similar configuration. A liquid containing the dye and circulating across the cavity could be excited by the openings of the cavity. Highly reflective mirrors would be required as the gain is low due to small amplification length.

Complex devices such as the fiber-integrated laser 120 can be manufactured using various processes. One is to secure a mirror 124 on each side of a large cavity 122 using local laser fusion. Alternatively, a ribbon including a mirror on each of its sides and filling a first cavity is positioned and secured inside this first cavity. The ribbon is subsequently drilled out to create a central cavity 122 for introducing the lasing medium.

Figure 7:
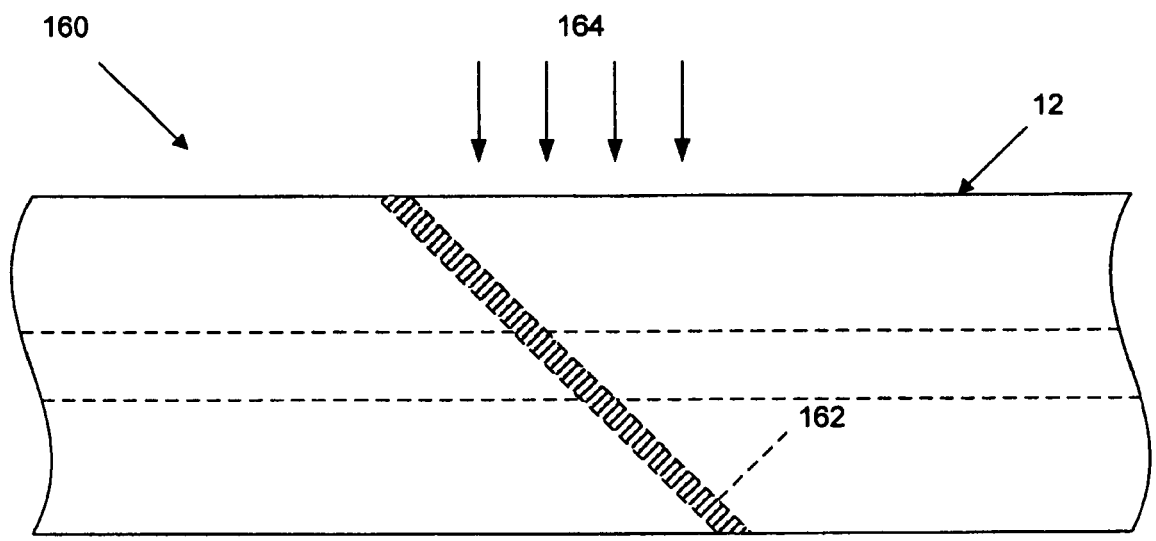
FIG. 7 is a front elevation view of a 45-degree mirror device using the optical fiber device configuration of FIG. 1.

The method of manufacturing an optical fiber device by component insertion involves various degrees of insertion. FIG. 7 illustrates a 45-degree mirror device 160 for laser pump injection. A dichroic mirror 162 is inserted and secured using laser fusion in a 45-degree cavity in the optical fiber 12. The 45-degree mirror device 160 can be used in a fiber laser for injecting laser pump 162 from the side of the optical fiber. In fiber lasers, pump efficiency decreases rapidly along the laser length. It is considered to inject pump at different positions along the laser fiber.

Polarization sensors are useful for smoke and other particles detection. An optical fiber device is used for diffusion measurement. Two crossed polarizers are inserted in an optical fiber, one on each side of a channel. A gas to be analyzed passes though the channel while light is provided at one end of the optical fiber. Diffusion is measured by measuring light intensity at the other end of the fiber.

One skilled in the art would understand that the method of manufacturing optical fiber devices by an insertion of a component in an optical fiber could be used for manufacturing a device using a plastic optical fiber. With some adjustments to the process parameters, plastic optical fibers could be machined using laser and a component could be secured in the fiber using thermal fusion.

The embodiments of the invention described above are intended to be exemplary only. The scope of the invention is therefore intended to be limited solely by the scope of the appended claims.

What is claimed is:

1. An optical fiber device comprising:
   an optical fiber for guiding light to be propagated in the optical fiber, said optical fiber having a peripheral surface, a fiber core and a fiber clad;
   a substantial tubular cavity defined in said optical fiber, said cavity penetrating said optical fiber through said peripheral surface and said fiber clad in direction of said fiber core and intersecting said fiber core; and
   a solid component secured inside said cavity and associated with said core so as to create a functional effect on said light to be propagated in said optical fiber.

2. The optical fiber device as claimed in claim 1, wherein said component is a ribbon and is inserted in said cavity by threading said ribbon through said cavity.

3. The optical fiber device as claimed in claim 2, wherein said cavity is a hole throughout said optical fiber, penetrating said optical fiber through said peripheral surface, intersecting said fiber core and exiting said optical fiber through said peripheral surface.

4. The optical fiber device as claimed in claim 1, wherein said component is secured in said cavity using fusion.

5. The optical fiber device as claimed in claim 4, wherein said fusion is carbon dioxide laser fusion.

6. The optical fiber device as claimed in claim 1, wherein said cavity is machined in said optical fiber using a machining laser.

7. The optical fiber device as claimed in claim 6, wherein said machining laser is a carbon dioxide laser.

8. The optical fiber device as claimed in claim 1, wherein a number of said cavity is at least two and a number of said component is at least two.

9. The optical fiber device as claimed in claim 1, further comprising two of said solid component in said cavity, with said solid components being mirrors positioned on opposed sides of said cavity, said mirrors being separated from one another such that a lasing medium is insertable between the mirrors for providing a fiber-integrated laser.

10. The optical fiber device as claimed in claim 1, further comprising two of said solid component in said cavity, with said solid components being crossed polarizers positioned on opposed sides of said cavity, said crossed polarizers being separated from one another such that a gas is insertable between the crossed polarizers for polarization sensing.

11. The optical fiber device as claimed in claim 1, further comprising two of said solid component and three of said cavity with said solid components being crossed polarizers positioned in a first and a second one of said cavities while a third central one of the cavities is provided to receive a gas to be analyzed by polarization sensing.

12. The optical fiber device as claimed in claim 1, further comprising a capillary accommodating the optical fiber and closing said cavity to enclose said component.

13. A method for manufacturing an optical fiber device comprising:
    machining a substantial tubular cavity in an optical fiber having a peripheral surface, a fiber core and a fiber clad, said cavity penetrating said optical fiber through said peripheral surface and said fiber clad in direction of said fiber core and intersecting said fiber core;
    providing a solid component to be inserted in said optical fiber;
    positioning said component inside said cavity; and
    securing said component in said cavity.

14. The method as claimed in claim 13, wherein said providing includes:
    manufacturing a drawing preform;
        machining said preform to obtain a rectangular-shaped preform;
    obtaining a ribbon by drawing said rectangular-shaped preform; and
    fixing a functional element on said ribbon.

15. The method as claimed in claim 13, wherein said cavity is a hole throughout said optical fiber, said component is a ribbon, and said step of positioning includes threading said ribbon through said hole.

16. The method as claimed in claim 13, wherein said securing is made using fusion.

17. The method as claimed in claim 13, wherein said fusion is carbon dioxide laser fusion.

18. The method as claimed in claim 13, wherein said cavity is a hole throughout said optical fiber, said step of providing a solid component includes manufacturing a ribbon with said component thereon, and said positioning includes threading said ribbon through said hole.

19. The method as claimed in claim 13, wherein said step of machining is performed using a machining laser.

20. The method as claimed in claim 19, wherein said machining laser is a carbon dioxide laser.

21. The method as claimed in claim 13, wherein said step of positioning includes:
    inserting said component in said hole; and
    aligning component using visual feedback.

22. The method as claimed in claim 13, wherein said step of positioning includes:
    inserting said component in said hole;
    obtaining a feedback signal by propagating an optical signal in said optical fiber to said component; and
    aligning said component using said feedback signal.

* * * * *

UNITED STATES PATENT AND TRADEMARK OFFICE
CERTIFICATE OF CORRECTION

PATENT NO. : 7,324,724 B2  Page 1 of 1
APPLICATION NO. : 11/254802
DATED : January 29, 2008
INVENTOR(S) : Marc Lévesque et al.

It is certified that error appears in the above-identified patent and that said Letters Patent is hereby corrected as shown below:

Column 6, line 56, claim 1, "substantial" should be changed to --substantially--.
Column 7, line 39, claim 13, "substantial" should be changed to --substantially--.

Signed and Sealed this

Fifteenth Day of July, 2008

JON W. DUDAS
*Director of the United States Patent and Trademark Office*